(12) United States Patent
López et al.

(10) Patent No.: US 12,367,085 B2
(45) Date of Patent: Jul. 22, 2025

(54) MACHINE LEARNING METHODS AND SYSTEMS FOR APPLICATION PROGRAM INTERFACE MANAGEMENT

(71) Applicant: QlikTech International AB, Lund (SE)

(72) Inventors: José Francisco Díaz López, Lund (SE); Mikael Danielsson, Lund (SE); Amanda Högberg, Lund (SE)

(73) Assignee: QlikTech International AB, Lund (SE)

( * ) Notice: Subject to any disclaimer, the term of this patent is extended or adjusted under 35 U.S.C. 154(b) by 0 days.

(21) Appl. No.: 17/728,471

(22) Filed: Apr. 25, 2022

(65) Prior Publication Data

US 2023/0342233 A1 Oct. 26, 2023

(51) Int. Cl.
*G06F 11/07* (2006.01)
*G06F 11/3604* (2025.01)
*G06N 3/04* (2023.01)

(52) U.S. Cl.
CPC ...... *G06F 11/0706* (2013.01); *G06F 11/3612* (2013.01); *G06N 3/04* (2013.01)

(58) Field of Classification Search
CPC .... G06F 11/0706; G06F 11/3612; G06N 3/04
USPC ........................................................ 717/127
See application file for complete search history.

(56) References Cited

U.S. PATENT DOCUMENTS

| | | | | |
|---|---|---|---|---|
| 10,853,441 | B1 * | 12/2020 | Adolphson | ........... G06F 40/242 |
| 11,074,305 | B1 * | 7/2021 | Ruiz | ................... G06F 16/2448 |
| 2014/0304389 | A1 * | 10/2014 | Reavis | ................ G06F 3/04847 |
| | | | | 709/224 |
| 2020/0110843 | A1 * | 4/2020 | Dunjic | ................ G06F 16/2455 |
| 2020/0273124 | A1 * | 8/2020 | Shah | ..................... G06Q 10/107 |
| 2022/0222526 | A1 * | 7/2022 | Hawkins | ................ G06N 3/045 |
| 2022/0237432 | A1 * | 7/2022 | Kumar | .............. G06Q 10/0838 |
| 2023/0012458 | A1 * | 1/2023 | Jain | ..................... G06Q 20/4016 |

* cited by examiner

*Primary Examiner* — Bradford F Wheaton
(74) *Attorney, Agent, or Firm* — Ballard Spahr LLP

(57) ABSTRACT

Described herein are machine learning methods and systems for application programming Interface (API) management. One or more machine learning-based models, such as a neural network, may be trained to provide a prediction(s) that an API request is likely to succeed (e.g., not cause the API to crash) or to fail (e.g., cause the API to crash, freeze, etc.). The one or more machine learning-based models may be trained using historical API requests that were successful and historical API requests that are not successful. Various aspects of the API requests, as well as system properties associated with the machine(s) that executes/processes the historical API requests, may be used as well when training the one or more machine learning-based models.

17 Claims, 12 Drawing Sheets

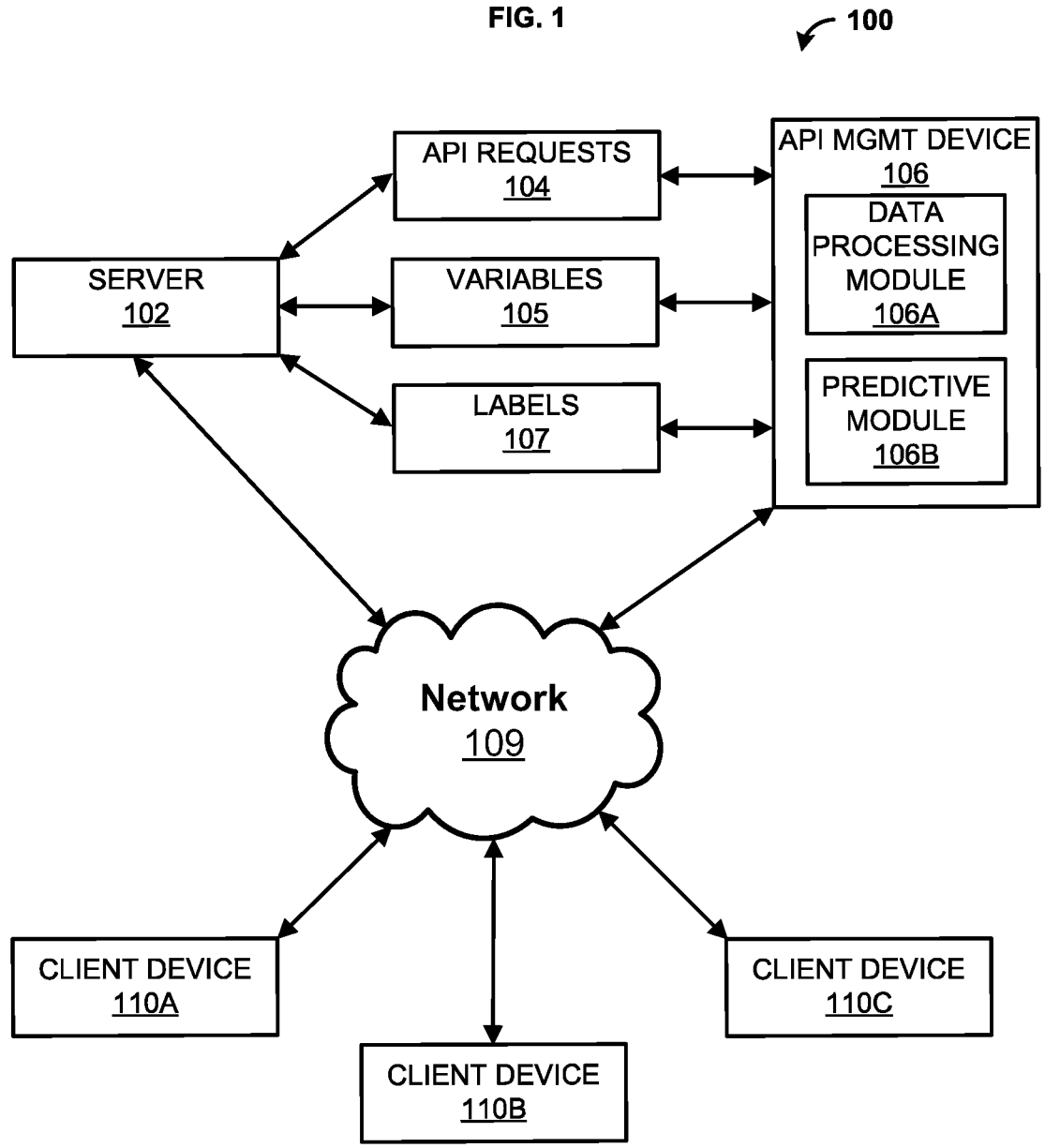

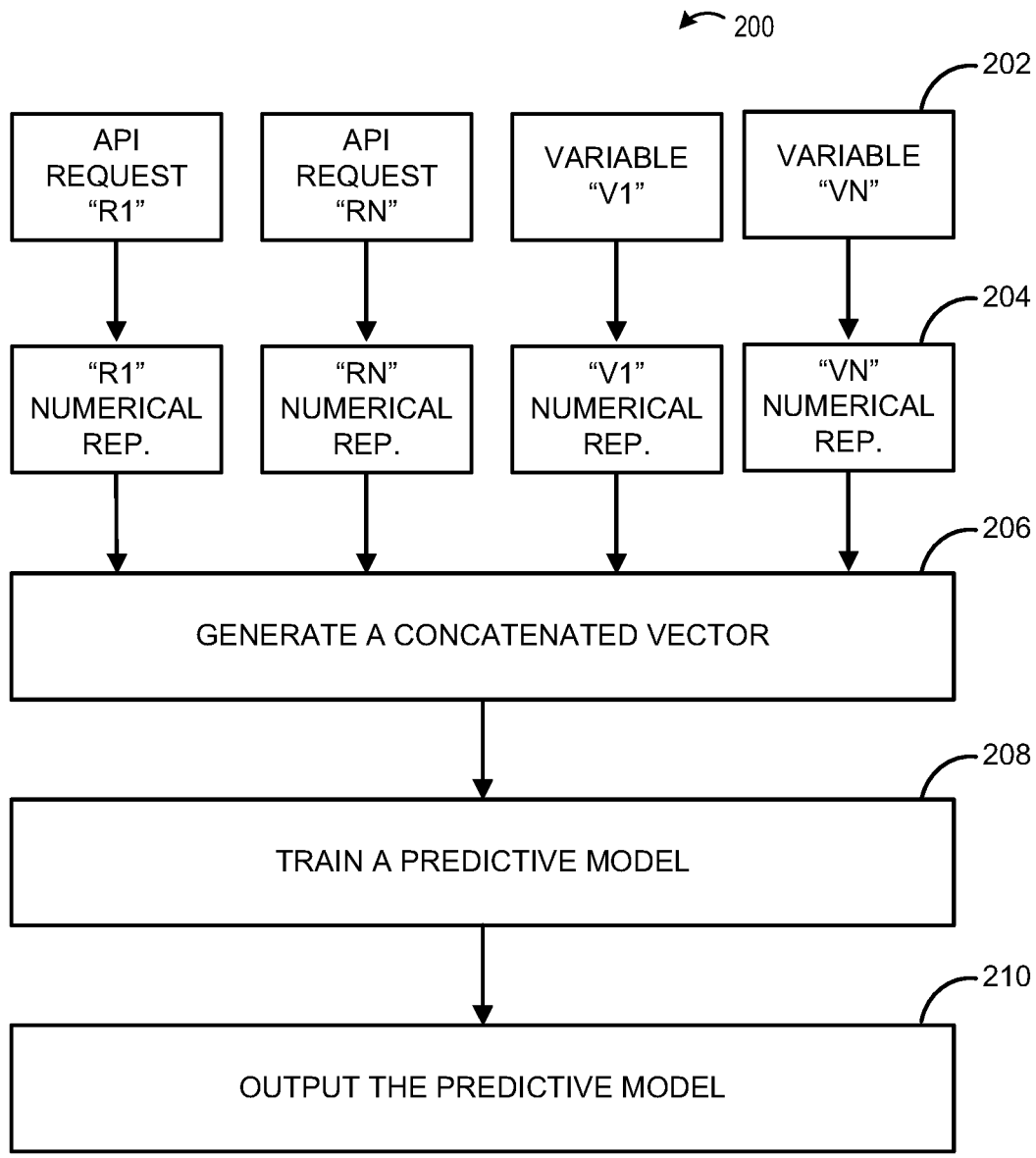

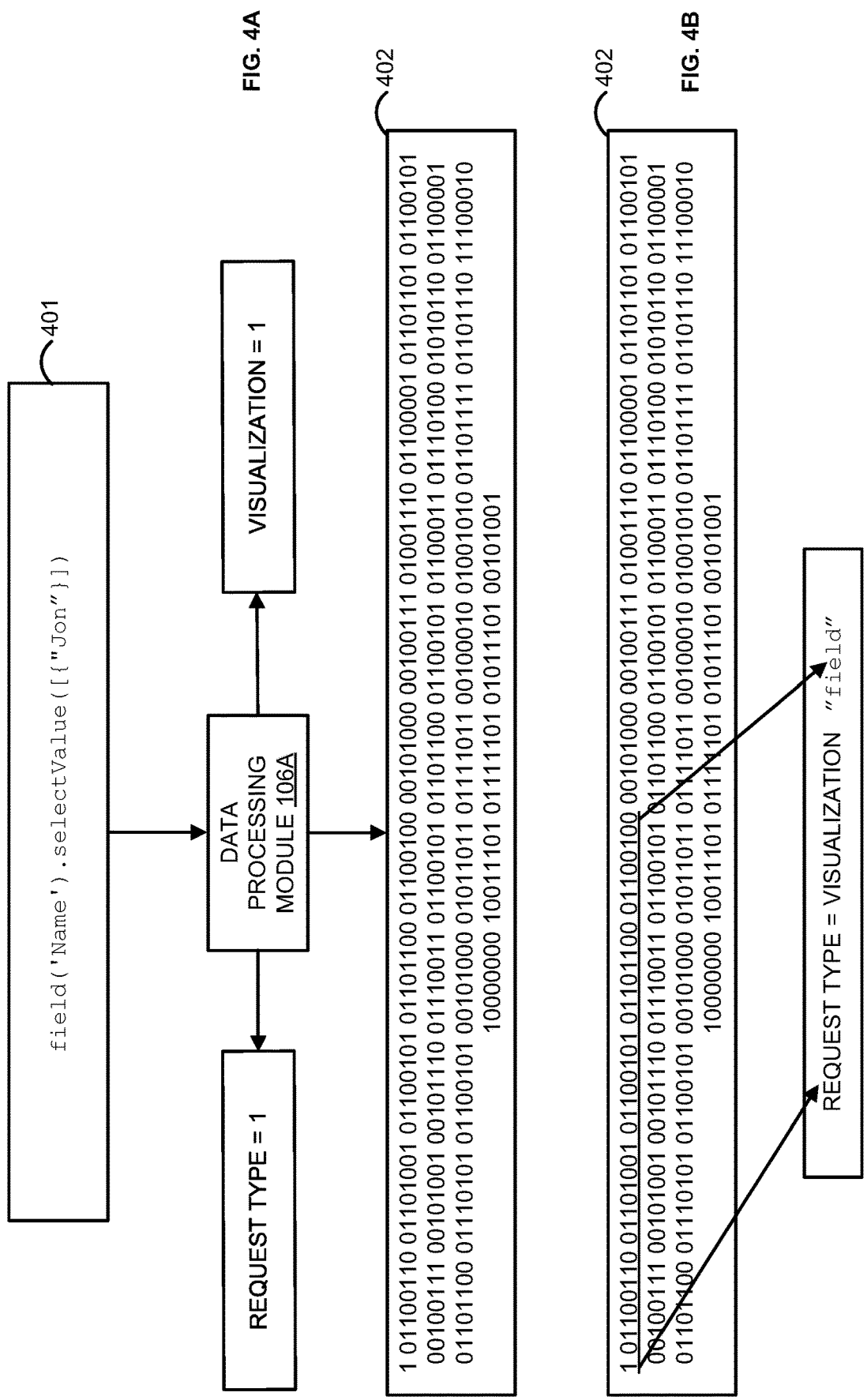

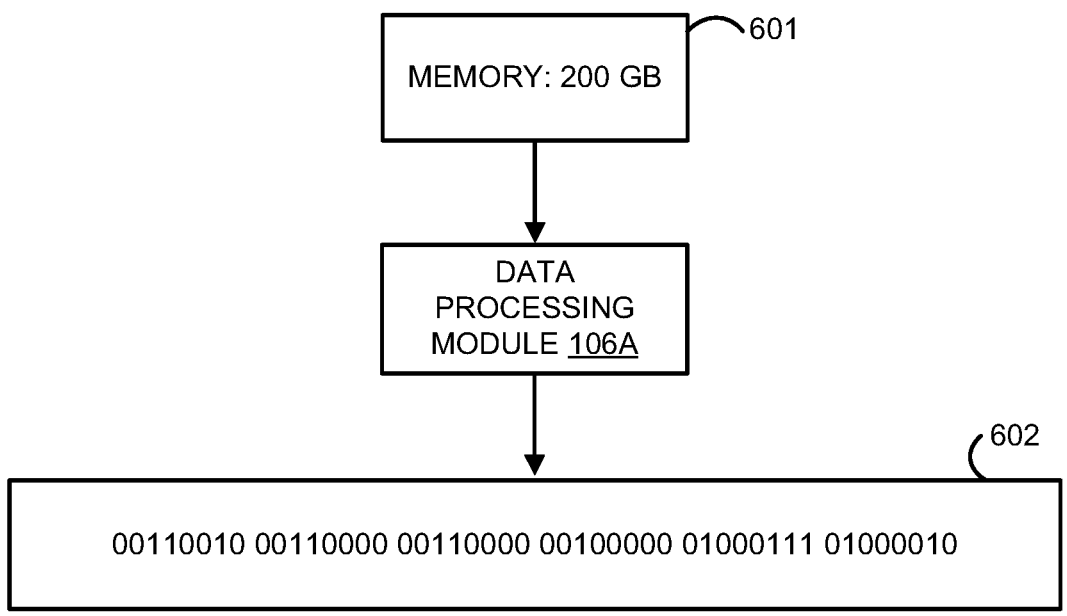
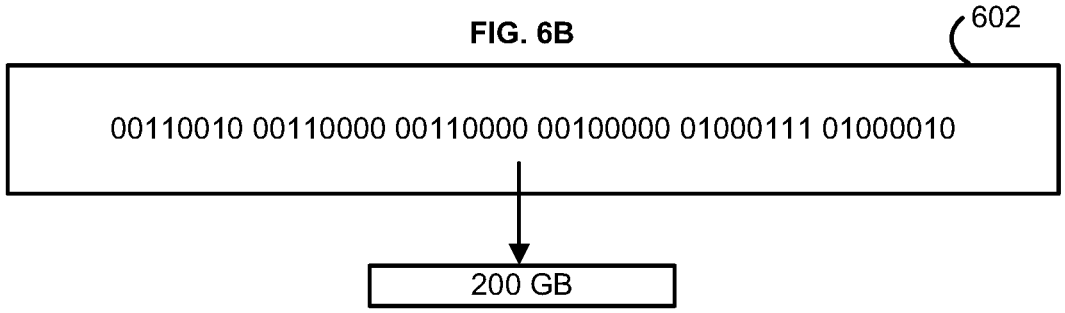

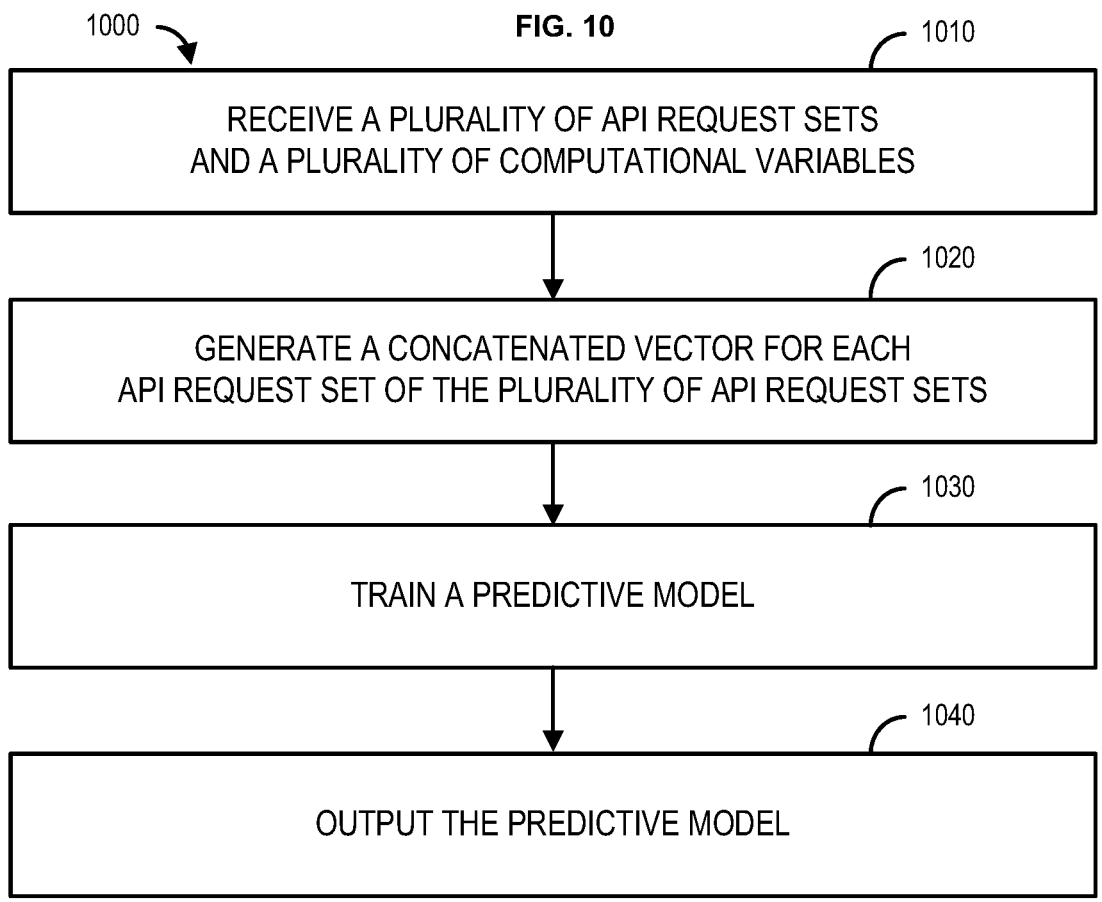

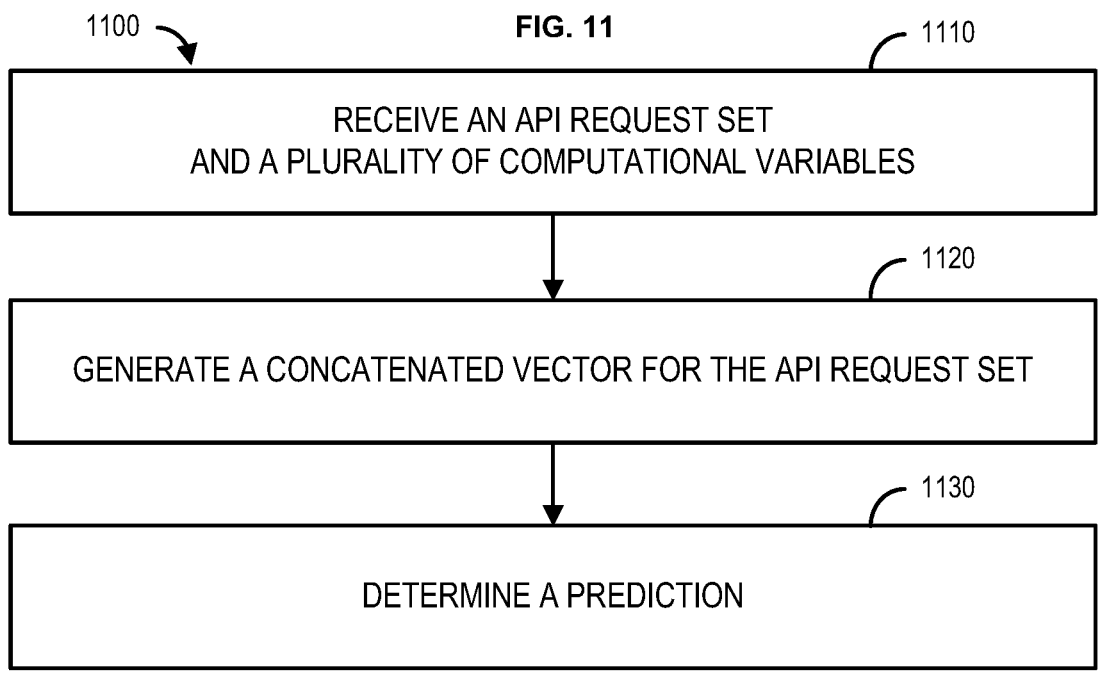

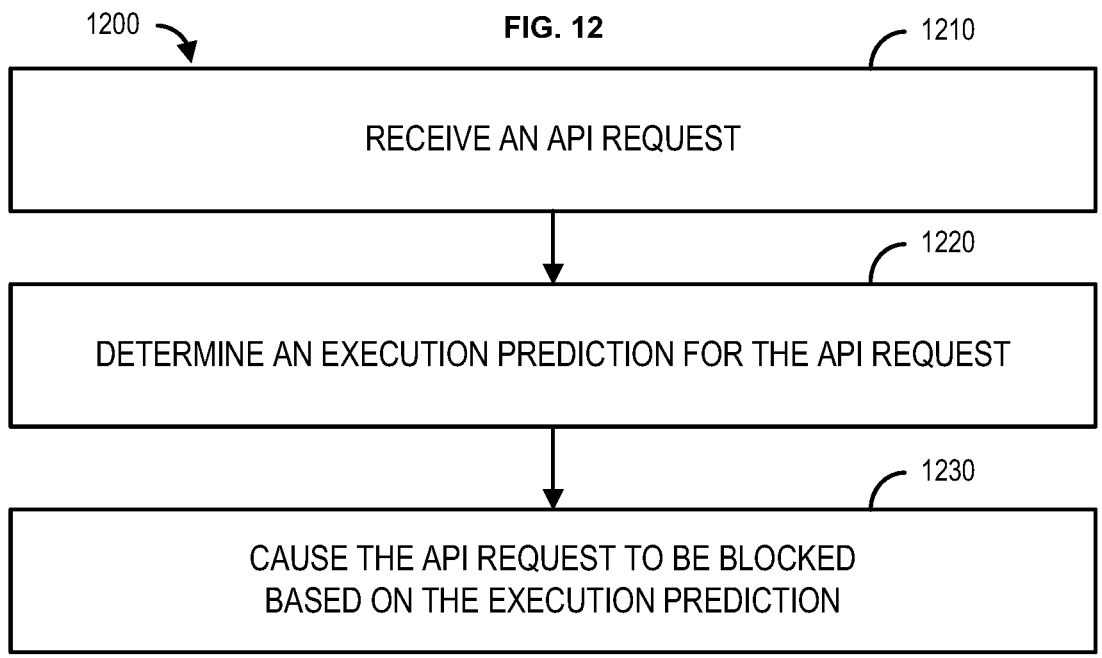

MACHINE LEARNING METHODS AND SYSTEMS FOR APPLICATION PROGRAM INTERFACE MANAGEMENT

BACKGROUND

Application programming interfaces (APIs) may experience problems, such as freezing, crashing, etc., when processing API requests that are coded improperly, include errors, etc. Existing methods and systems for API management may prevent certain types and aspects of problematic API requests from being processed using, for example, an API governance policy that defines rules for API requests. However, these existing methods and systems may not sufficiently account for API requests that pass an API governance policy but are nonetheless problematic (e.g., likely to cause the API to freeze, crash, etc.). These and other considerations are described herein.

SUMMARY

It is to be understood that both the following general description and the following detailed description are exemplary and explanatory only and are not restrictive. Described herein are machine learning methods and systems for application programming Interface (API) management. One or more machine learning-based models, such as a neural network(s), may be trained to provide a prediction(s) that an API request is likely to succeed or to fail. For example, the one or more machine learning-based models may analyze the API request and predict whether the machine(s) that processes the API request is likely (or not) to freeze, crash, or otherwise become unavailable for use. The one or more machine learning-based models may be trained using historical API requests that were successful (e.g., those that did not cause a crash, freeze, etc.) and historical API requests that are not successful (e.g., those that did cause a crash, freeze, etc.). The one or more machine learning-based models may analyze various aspects of API requests, as well as system properties associated with a machine(s) that executes/processes the API requests during training (e.g., historical API requests) as well as during testing (e.g., post-training analysis of "unseen" API requests). The prediction(s) provided by the one or more machine learning-based models, once trained, may include a score, a binary classification, a level of confidence, etc. Additional advantages of the disclosed methods and systems will be set forth in part in the description that follows, and in part will be understood from the description, or may be learned by practice of the disclosed method and systems.

BRIEF DESCRIPTION OF THE DRAWINGS

The accompanying drawings, which are incorporated in and constitute a part of the present description, serve to explain the principles of the methods and systems described herein:

FIG. 1 shows an example system;
FIG. 2 shows a flowchart for an example method;
FIG. 4A shows an example numerical representation;
FIG. 4B shows an example numerical representation;
FIG. 6A shows an example numerical representation;
FIG. 6B shows an example numerical representation;
FIG. 10 shows a flowchart for an example method;
FIG. 11 shows a flowchart for an example method;
and
FIG. 12 shows a flowchart for an example method.

DETAILED DESCRIPTION

Figures 3A, 3B:
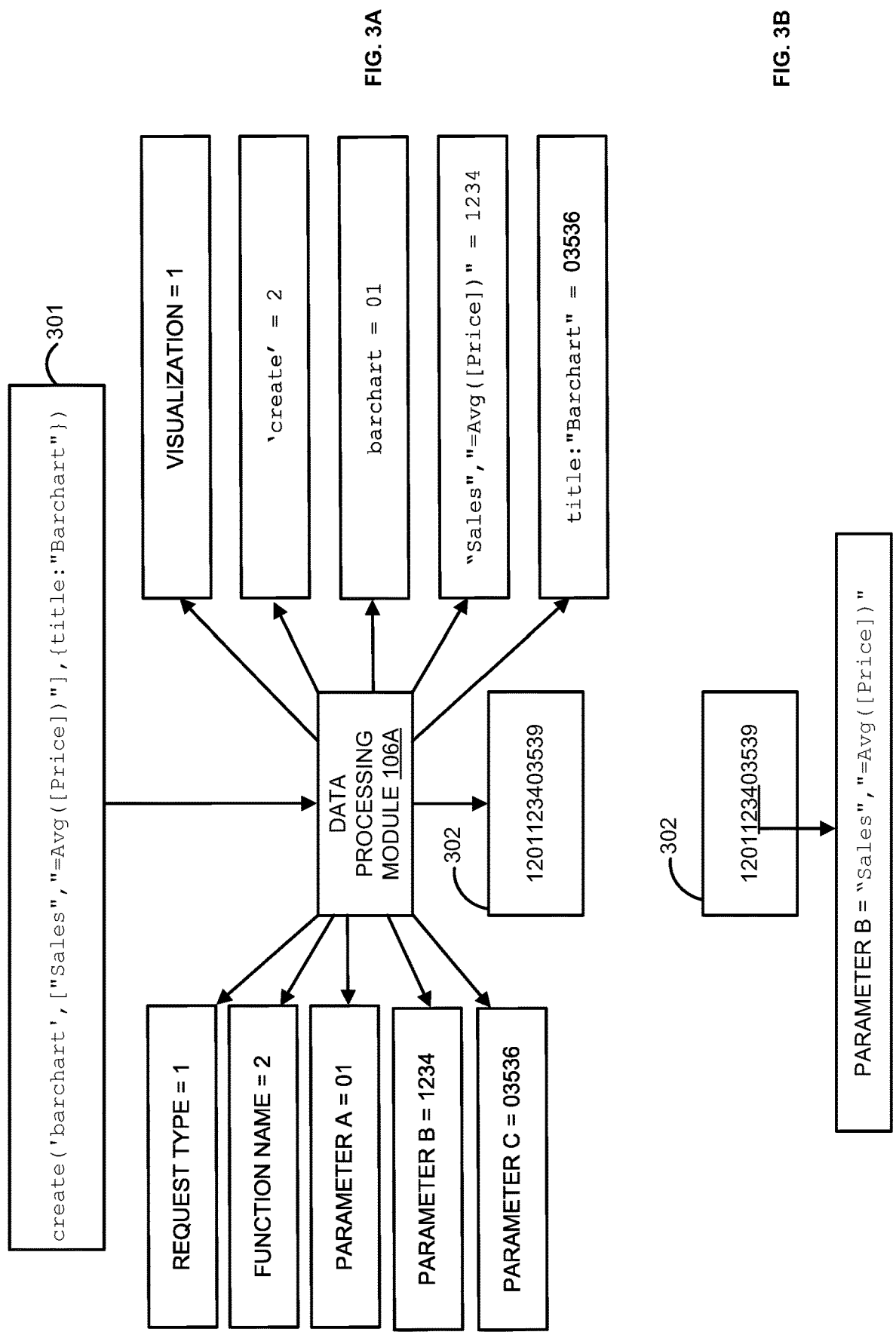
FIG. 3A shows an example numerical representation.
FIG. 3B shows an example numerical representation.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Turning now to FIG. 1, a system 100 is shown. The system 100 may comprise a plurality of computing devices/entities that are in communication via a network 109. The network 109 may comprise an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, a combination thereof, and/or the like. Data may be sent on the network 109 via a variety of transmission paths, including wireless paths (e.g., satellite paths, Wi-Fi paths, cellular paths, etc.) and terrestrial paths (e.g., wired paths, a direct feed source via a direct line, etc.). The network 109 may comprise public networks, private networks, wide area networks (e.g., Internet), local area networks, and/or the like. The network 109 may be configured to transmit data from a variety of sources using a variety of network paths, protocols, devices, and/or the like.

The system 100 may be configured to generate, train, and/or tailor one or more machine learning-based models. For example, the system 100 may be configured for application programming Interface (API) management, as discussed further herein, and may provide a prediction(s) that an "unseen" API request (e.g., a new/unprocessed API request) is likely to succeed or to fail. For example, the system 100 may analyze an unseen API request and predict whether the machine(s) that processes that API request is likely (or not) to freeze, crash, or otherwise become unavailable for use.

The system 100 may comprise an API management device 106. The API management device 106 may comprise, for example, a laptop computer, a desktop computer, a server computer, a smartphone, a tablet, a combination thereof, and/or the like. The API management device 106 may be configured to generate, store, maintain, and/or update various data structures, including a database(s), for storage of API requests 104, computational variables 105, and labels 107.

The API requests 104 may comprise a plurality of API requests sets, which may each in turn comprise one or more API requests. Each API request set, of the plurality of API requests sets, may be associated with a particular type, group, and/or any other logical classification for one or more API requests that are similar. An example API request set may include one or more API requests that have any (or all) of the following attributes in common: an API call(s), API call type(s), function(s), function type(s), parameter(s), parameter types(s), data type(s), expression(s), expression type(s), calculation(s), calculation type(s), update(s), update type(s), a combination thereof, and/or the like.

The computational variables 105 may comprise a plurality of attributes, parameters, etc., associated with a machine(s) (e.g., a computing device(s)) that executed/processed (or will execute/process) each of the API requests 104. Each API request may be associated with at least one computational variable of the computational variables 105. As an example, the at least one computational variable associated with an API request that has already been processed/executed may comprise one or more of the following: a number of machines (e.g., computing devices) required to process/execute the API request; an amount of system memory required to process/execute the API request; an amount of processing resources required to process/execute the API request; a number of processors; a type of each processor; a total amount of system memory; a type of system memory; a combination thereof; and/or the like.

Each of the API requests 104 and/or each of the computational variables 105 may be associated with one or more of the labels 107. The labels 107 may comprise a plurality of binary labels, a plurality of percentage values, etc. In some examples, the labels 107 may comprise (or be indicative of) one or more attributes/aspects of the API requests 104 or the computational variables 105. An example label of the labels 107 for one of the API requests 104 (e.g., an API request within a set of API requests) may comprise a binary label of "successful" (e.g., successfully executed/processed) or "unsuccessful" (e.g., not successfully executed/processed) indicating whether the corresponding API request was successfully executed/processed. As another example, each of the labels 107 may indicate one or more of the computational variables 105 associated with the particular API request along with an indication of whether the corresponding API request was successfully executed/processed.

The system 100 may be part of a Software as a Service (SaaS) platform. The system 100 may comprise a server 102 configured to implement aspects of the SaaS platform. For example, the server 102 may be in communication with a plurality of client devices 110A-110C. The server 102 may host/store data related to the SaaS platform, such as a public cloud or components thereof, and the plurality of client devices 110A-110C may interact with the SaaS platform via the network 109 and the server 102. The SaaS platform may comprise one or more the APIs described herein. Each of the plurality of client devices 110A-110C may generate and/or send data relating to (and/or comprising) the API requests 104, the computational variables 105, and/or the labels 107 described herein, which may be stored at the server 102 and/or at a remote storage repository (not shown).

The API management device 106 may comprise a data processing module 106A and a predictive module 106B. The data processing module 106A and the predictive module 106B may be stored and/or configured to operate on the API management device 106 or separately on separate computing devices (e.g., on the server 102 and/or another computing device(s) (not shown)). The API management device 106 may comprise and/or use the one or more machine learning-based models described herein, such as predictive models, to analyze the API requests 104, the computational variables 105, and/or the labels 107. The API management device 106 may receive the API requests 104, the computational variables 105, and/or the labels 107 from the server 102. The API requests 104 may comprise any type of API request, such as strings of alphanumeric characters, words, phrases, symbols, etc. The API requests 104, the computational variables 105, and/or the labels 107 may be sent/received via any suitable data storage format/file as are known to those skilled in the art.

As further described herein, the data processing module 106A may process the API requests 104 and the computational variables 105 into numerical representations. For example, the data processing module 106A may output a vector representation, a fingerprint, etc., of any of the API requests 104 and/or any of the computational variables 105. A numerical representation of an API request may be based on attributes associated with the API request and/or the corresponding API request set. Such attributes may include, for example, attributes relating to an API call(s), API call type(s), function(s), function type(s), parameter(s), parameter types(s), data type(s), expression(s), expression type(s), calculation(s), calculation type(s), update(s), update type(s), a combination thereof, and/or the like.

Each of the API requests 104 may comprise strings of alphanumeric characters, words, phrases, symbols, etc., and each element of each of the API requests 104 may be converted into a numeric form. A dictionary comprising mappings between elements of the API requests 104 and their respective numerical form may be stored at the API management device 106 (or any other entity/device of the system 100). The dictionary may be used to convert the each of the API requests 104 into an integer form, a one-hot representation of the integer form, etc. Each of the computational variables 105 may comprise strings of alphanumeric characters, words, phrases, symbols, etc., and each element of each of the computational variables 105 may be converted into a numeric form. The dictionary may further comprise mappings between elements of the computational variables 105 and their respective numerical form. The dictionary may be used to convert the each of the computational variables 105 into an integer form, a one-hot representation of the integer form, etc.

The numerical representation for each API request may be concatenated with a numerical representation of a corresponding computational variable(s) and into a single concatenated numerical representation (e.g., a concatenated vector). Such numerical representations may be referred to herein as concatenated vectors. Concatenated vectors may describe an API request and its corresponding computational variable(s) as a single numerical vector, fingerprint, representation, etc. The concatenated vectors may be passed to the one or more machine learning-based models, which may be generated by the predictive module 106B. The one or more machine learning-based models may process concatenated vectors and provide an output comprising one or more of a prediction, a score, etc. The one or more machine learning-based models may comprise, as an example, a neural network, as further described herein. The one or more machine learning-based models described herein may be trained—or retrained as the case may be—to perform binomial, multinomial, regression, and/or other tasks. As an example, the one or more machine learning-based models may be used by the API management device 106 to provide a prediction of whether attributes associated with a particular API request(s) and/or computational variable(s) are indicative of a particular result for the API request(s) (e.g., a binary prediction, a confidence score, a prediction score, etc.).

FIG. 2 shows a flowchart of an example method 200. The method 200 may be performed by the data processing module 106A and/or the predictive module 106B. Some steps of the method 200 may be performed by the data processing module 106A, and other steps may be performed by the predictive module 106B. The method 200 may use or be associated with a neural network architecture of the one or more machine learning-based models. For example, the neural network architecture used in the method 200 may comprise a plurality of neural network blocks and/or layers that may be used to generate numerical representations of each of the API requests 104 and the computational variables 105 (e.g., based on the attributes thereof) associated therewith. Continuing with this example, each attribute of each of the API requests 104 may be associated with a corresponding neural network block and/or layer, and each attribute of the computational variables 105 may be associated with a corresponding neural network block and/or layer.

A subset of the API requests 104 and/or a subset of the attributes associated with each of the API requests 104 may be used rather than each and every API request and/or attribute of the API requests 104. If a subset of the API requests 104 contains one or more attributes that do not have a corresponding neural network block, then the API requests associated with those one or more attributes may be disregarded by the method 200. In this way, a given machine learning-based model generated by (and/or used by) the API management device 106 may receive all of the API requests 104 but only a subset of the API requests 104 that have corresponding neural network blocks may be used by the method 200. As another example, even if all of the API requests 104 contain attributes that each have a corresponding neural network block, a subset of the API requests 104 may nevertheless not be used by the method 200. Determining which API requests and corresponding computational variables, attributes thereof, and/or corresponding neural network blocks that are used by the method 200 may be based on a chosen set of hyperparameters and/or based on a keyed dictionary/mapping between attributes and corresponding neural network blocks. Other examples are possible as well.

The method 200 may employ a plurality of processors, such as a plurality of algorithms, routines, subroutines, components, modules, etc., that are configured to convert alphanumeric characters, words, phrases, symbols, etc., into unique identifiers, tokens, etc. The plurality of processors may convert attributes of each of the API requests 104, such as strings of alphanumeric characters, words, phrases, symbols, etc., into corresponding numerical representations. The plurality of processors may convert attributes associated with each of the computational variables 105, such as strings of alphanumeric characters, words, phrases, symbols, etc., into corresponding numerical representations. In some examples, the plurality of processors may not be used by the method 200. For example, the plurality of processors may not be used for any of the API requests 104 or the computational variables 105 that are stored in numerical form.

For purposes of explanation, an example of the method 200 is described herein for example API request sets R1 and RN (e.g., of the API requests 104) and example computational variables V1 and VN (e.g., of the computational variables 105) that correspond to the API request sets R1 and RN. At step 202, the data processing module 106A may receive the API request sets R1 and RN and the corresponding computational variables V1 and VN. Each of the API request sets R1 and RN may be associated with a label, such as a binary label (e.g., yes/no) and/or a percentage value (e.g., a label of the labels 107), indicating whether the corresponding API requests were successfully executed/processed. Each of the computational variables V1 and VN may be associated with the label (e.g., the binary label and/or the percentage value) and a corresponding API request(s) within the API request sets R1 and RN.

At step 204, the data processing module 106A may determine a numerical representation for each API request within the API request sets R1 and RN and for each of the computational variables V1 and VN associated therewith. For example, the data processing module 106A may use the plurality of processors to convert attributes associated with each API request within the API request sets R1 and RN into corresponding numerical representations. The plurality of processors may convert attributes associated with the computational variables 105 into corresponding numerical representations. Each numerical representation may comprise a one-dimensional integer representation, a multi-dimensional array representation, a combination thereof, and/or the like. Each of the API request sets R1 and RN may be associated with a corresponding neural network block based on corresponding data type(s) and/or attribute values. As another example, each of the computational variables V1 and VN may be associated with a corresponding neural network block based on corresponding data type(s) and/or attribute values.

FIG. 3A shows an example result of the data processing module 106A converting an API request 301 within the API request set R1 and/or the API request set RN into a numerical representation 302 at step 204. The API request 301 may comprise the following code: create('barchart',["Sales", "=Avg([Price])"],{title:"Barchart"}). The API request 301 may be associated with a request type of "visualization" (e.g., indicating the API request 301 is for the corresponding API to output a visualization). The API request 301 may comprise a "create" function (shown as Function Name in FIG. 3A). The API request 301 may comprise three parameters: Parameter A, Parameter B, and Parameter C, each of which may be assigned a value.

As shown in FIG. 3A, the data processing module 106A (e.g., using the plurality of processors described herein) may convert each part/attribute of the API request 301 into a numerical representation 302. The data processing module 106A may assign each part of the API request 301 a unique numerical representation, such as "1" for a Request Type that comprises "visualization, "2" for a Function Name, etc., as shown in FIG. 3A. That is, the data processing module 106A may assign each part of the API request 301 a unique numerical representation by using integer values, as shown in FIG. 3A. The data processing module 106A may determine an integer value for every other attribute associated with the API request 301. For example, the string value of "barchart" within the code for the API request 301 may be assigned an integer value of "02," the string value of "'Sales","=Avg([Price])'" may be assigned an integer value of 1234, and so forth. The integer values may be random or they may be determined using one or more tokenizing methods known in the art.

The numerical representation 302 may comprise a one-dimensional integer representation of "1201123403539."

The data processing module 106A may generate the numerical representation 302 in an ordered manner. For example, a first portion of the numerical representation 302 ("1") may represent the Request Type (e.g., a value of "visualization"=1). As another example, a second portion may represent the Function Name (e.g., a value of "2" for the function 'create'). Remaining portions may be ordered similarly. For example, as shown in FIG. 3B, a fourth portion of the numerical representation 302 may correspond to Parameter B ("'Sales","=Avg([Price])"=1234'"), which may be assigned a value of "1234." Additionally, the data processing module 106A may generate the numerical representation 302 in another ordered manner, as one skilled in the art may appreciate.

The data processing module 106A may convert the API requests R1 and RN into a numerical representation that comprises an array of binary values in lieu of (or in addition to) the numerical representation shown in FIG. 3A. For example, FIG. 4A shows an example result of the data processing module 106A converting an API request 401 within the API request set R1 and/or the API request set RN into an array of binary values 402. The API request 401 may comprise the following code: field('Name').selectValue ([{"Jon"}]). The API request 401 may be associated with a request type of "visualization" (e.g., indicating the API request 401 is for the corresponding API to output a visualization). As shown in FIG. 4B, a first portion of the array of binary values 402 may represent the Request Type (e.g., a value of "visualization"=1) and a second portion may represent the word "field," which corresponds to a function name within the code of the API request 401.

Figure 5A:
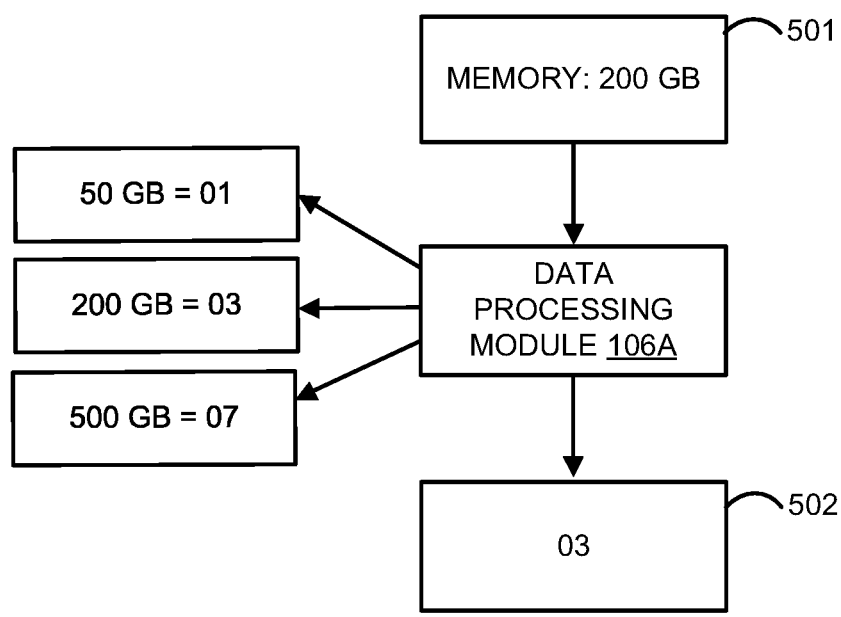
FIG. 5A shows an example numerical representation.
Figure 5B:
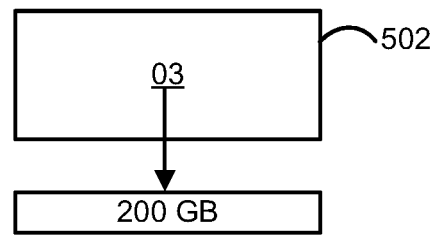
FIG. 5B shows an example numerical representation.

FIG. 5A shows an example result of the data processing module 106A converting a computational variable 501, such as the computational variable V1 or VN, into a numerical representation 502 at step 204. The data processing module 106A may convert the computational variable 501, which may comprise a memory attribute with a value of "200 GB," into the numerical representation 502. The data processing module 106A may associate an integer value to each possible string value for the memory attribute. For example, as shown in FIG. 5A, the string value of "50 GB" (e.g., 50 gigabytes of memory) may be associated with an integer value of "01"; the string value of "200 GB" (e.g., 200 gigabytes of memory) may be associated with an integer value of "03"; and the string value of "500 GB" (e.g., 500 gigabytes of memory) may be associated with an integer value of "07." These integer values may be chosen randomly or according to one or more tokenizing methods known in the art. FIG. 5B shows how the numerical representation 502 corresponds to the string value of "200 GB" (e.g., 200 gigabytes of memory).

The data processing module 106A may convert the computational variables V1 and VN into a numerical representation that comprises an array of binary values in lieu of (or in addition to) the numerical representation shown in FIG. 5A. For example, FIG. 6A shows an example result of the data processing module 106A converting a computational variable 601 into an array of binary values 602 that represent the string value of "200 GB" (e.g., 200 gigabytes of memory). Each of the computational variables V1 and VN may be converted accordingly.

At step 206, the data processing module 106A may output the numerical representations of each API request within the API request set R1 and the API request set RN. Each numerical representation for each API request within each API request set R1 or RN may be combined into a single numerical representation. That is, the numerical representations for each of the API requests within the API request set (R1 or RN) may be combined into a single numerical representation—referred to herein as a "concatenated vector" for the API request set.

At step 208, the data processing module 106A may provide the concatenated vectors generated at step 206 to the predictive module 106B. The predictive module 106B may comprise (or generate) the one or more machine learning-based models described herein. The processes by which the predictive module 106B may train the one or more machine learning-based models using the concatenated vectors are further explained herein. At step 210, the predictive module 106B may output the trained one or more machine learning-based models—referred to herein as a "predictive model". The predictive model may be capable of analyzing an "unseen" API request (e.g., a new/unprocessed API request) and providing a prediction(s) that the "unseen" API request is likely to succeed or to fail.

For example, the API management device 106 may receive a previously unseen API request (a "first API request") and a previously unseen plurality of computational variables (a "first plurality of variables) associated with a machine(s) that is to process/execute the first API request. The data processing module 106A may determine a numerical representation for one or more attributes associated with the first API request. For example, the data processing module 106A may determine the numerical representation for the one or more attributes associated with the first API request in a similar manner as described above regarding the API requests of the API request sets R1 and RN that were used to train the predictive model. The data processing module 106A may determine a numerical representation for the plurality of computational variables. For example, the data processing module 106A may determine the numerical representation for the computational variable attribute in a similar manner as described above regarding the computational variables V1 and VN that were used to train the predictive model.

The data processing module 106A may generate a concatenated vector based on the numerical representations (e.g., vectors) associated with the first API request. The predictive module 106B may use the predictive model that was trained according to the method 200 described above to determine a prediction associated with the first API request based on the concatenated vector. The prediction may be indicative of a likelihood that a first label applies to the first API request based on the one or more attributes associated with the first API request and the computational variables. For example, the first label may be a binary label of the labels 107 comprising "Likely to Execute Successfully" or "Not Likely to Execute Successfully."

The predictive module 106B may use the predictive model that was trained according to the method 200 to analyze any type of API request and any type of computational variable that may be expressed numerically (e.g., represented numerically). For example, the API requests 104 and the computational variables 105 may comprise one or more strings of data; one or more integers of data; one or more characters of data; a combination thereof and/or the like. Further, in addition to a binary label as described above, the labels 107 described herein may comprise a percentage value(s), one or more attributes associated with a corresponding API request and/or computational variable, one or more values for the one or more attributes/computational variables, or any other label as one skilled in the art can appreciate. As described above, the first label may comprise "Likely to Execute Successfully" or "Not Likely to Execute Successfully." The first binary label may be output with an indication of one or more computational variables that are predicted to be required by the machine(s) that processes/executes the first API request. For example, the first binary label may comprise an indication that the first API request is X % likely to execute successfully on a machine(s) that has Y GB of memory. Other computational variables may be indicated as well, such as a predicted amount of processing resources, etc.

Figure 7:
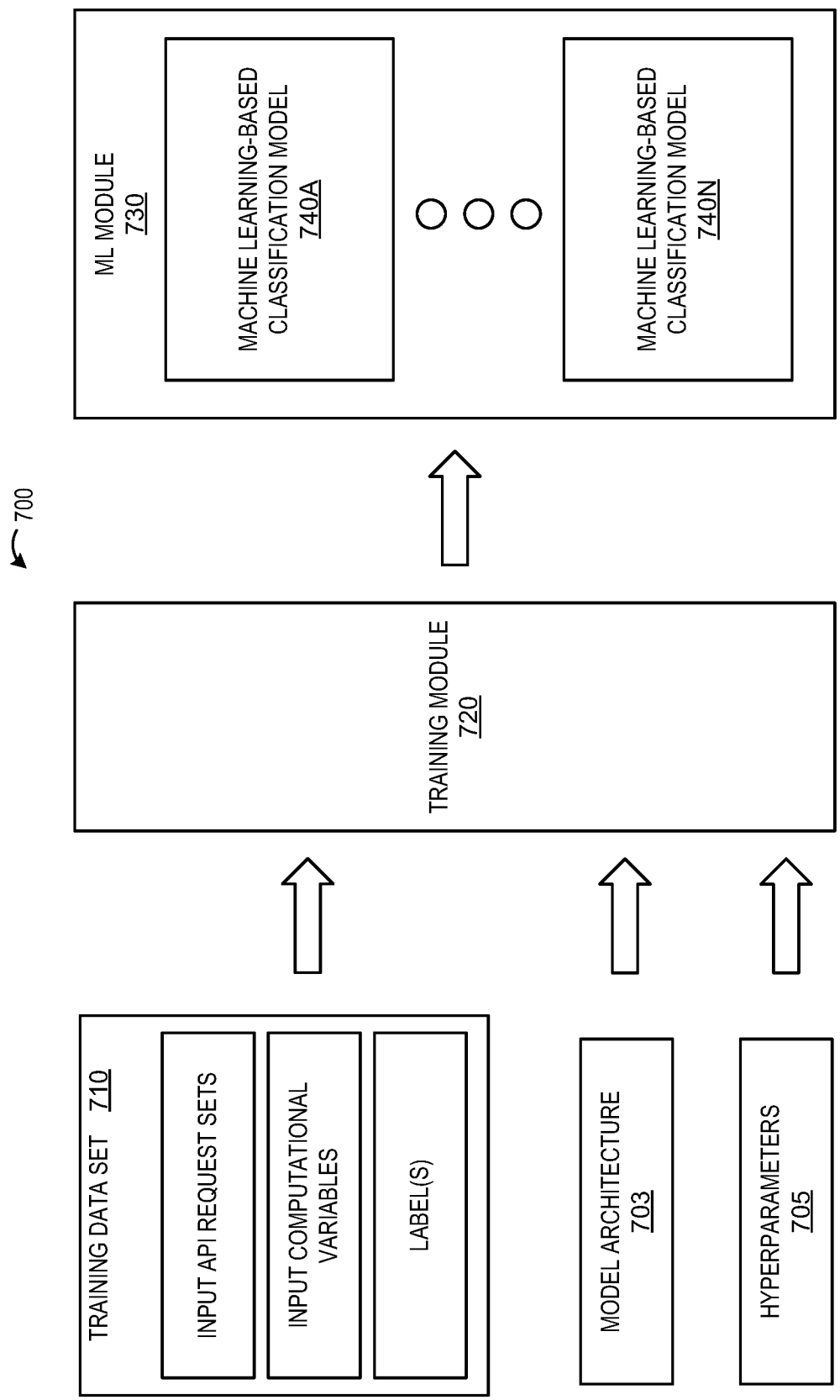
FIG. 7 shows an example system.

Turning now to FIG. 7, an example method 700 is shown. The method 700 may be performed by the predictive module 106B described herein. The predictive module 106B may be configured to use machine learning ("ML") techniques to train, based on an analysis of one or more training data sets 710 by a training module 720, at least one ML module 730 that is configured to provide one or more of a prediction or a score associated with API requests and one or more corresponding computational variables. The predictive module 106B may be configured to train and configure the ML module 730 using one or more hyperparameters 705 and a model architecture 703. The model architecture 703 may comprise the predictive model output at step 210 of the method 200 (e.g., a neural network architecture). The hyperparameters 705 may comprise a number of neural network layers/blocks, a number of neural network filters in a neural network layer, etc. Each set of the hyperparameters 705 may be used to build the model architecture 703, and an element of each set of the hyperparameters 705 may comprise a number of inputs (e.g., API request attributes/variables) to include in the model architecture 703.

For example, continuing with the above example regarding API requests and computational variables, an element of a first set of the hyperparameters 705 may comprise all API requests within an API request set and/or all computational variables associated with that particular API request set. An element of a second set of the hyperparameters 705 may comprise less than all API requests within an API request set and/or less than all computational variables associated with that particular API request set. In other words, an element of each set of the hyperparameters 705 may indicate that as few as one or as many as all API requests within an API request set and/or as few as one or as many as all computational variables associated with that particular API request set are to be used to build the model architecture 703 that is used to train the ML module 730.

As another example, an element of a third set of the hyperparameters 705 may comprise an amount/selection of each numerical representation of each API request and/or computational variable that is used by the model. For example, a first portion of the numerical representation may represent a Request Type (e.g., a value of "visualization"=1) and another portion may represent a Function Name (e.g., a value of "2" for the function 'create'). The element of the third set of the hyperparameters 705 may indicate one or more portions of numerical representations that are to be used for training and/or testing (e.g., use) of the model.

As a further example, an element of a fourth set of the hyperparameters 705 may comprise a number of outputs. For example, the model could be configured to provide one, or more than one, output. Examples of outputs include, but are not limited to: an indication of whether a particular API request is likely (or not) to execute successfully; an indication of one or more computational variables that are predicted to be required by a machine(s) that processes/executes the particular API request; a combination of the two; and/or the like.

The training data set 710 may comprise one or more input API request sets (e.g., the API requests 104) and one or more input computational variables (e.g., the computational variables 105) associated with one or more labels 107 (e.g., a binary label (yes/no) and/or a percentage value). The label for a given API request (or API request set) and/or a given computational variable may be indicative of a likelihood that the label applies to the given API request (or API request set). One or more of the API requests 104 and one or more of the computational variables 105 may be combined to result in the training data set 710. A subset of the API requests 104 and/or the computational variables 105 may be randomly assigned to the training data set 710 or to a testing data set. In some implementations, the assignment of data to a training data set or a testing data set may not be completely random. In this case, one or more criteria may be used during the assignment. In general, any suitable method may be used to assign the data to the training or testing data sets, while ensuring that the distributions of yes and no labels are somewhat similar in the training data set and the testing data set.

The training module 720 may train the ML module 730 by extracting a feature set from a plurality of application programming interface (API) request sets (e.g., labeled as yes/likely to execute successfully) in the training data set 710 according to one or more feature selection techniques. The training module 720 may train the ML module 730 by extracting a feature set from the training data set 710 that includes statistically significant features of positive examples (e.g., labeled as being yes/likely to execute successfully) and statistically significant features of negative examples (e.g., labeled as being no/not likely to execute successfully).

The training module 720 may extract a feature set from the training data set 710 in a variety of ways. The training module 720 may perform feature extraction multiple times, each time using a different feature-extraction technique. In an example, the feature sets generated using the different techniques may each be used to generate different machine learning-based classification models 740A-740N. For example, the feature set with the highest quality metrics may be selected for use in training. The training module 720 may use the feature set(s) to build one or more machine learning-based classification models 740A-740N that are configured to indicate whether a particular label applies to a new/unseen API request based on attributes of the API request.

The training data set 710 may be analyzed to determine any dependencies, associations, and/or correlations between features and the yes/no labels in the training data set 710. The identified correlations may have the form of a list of features that are associated with different yes/no labels. The term "feature," as used herein, may refer to any characteristic of an item of data that may be used to determine whether the item of data falls within one or more specific categories. A feature selection technique may comprise one or more feature selection rules. The one or more feature selection rules may comprise a feature occurrence rule. The feature occurrence rule may comprise determining which features in the training data set 710 occur over a threshold number of times and identifying those features that satisfy the threshold as candidate features.

A single feature selection rule may be applied to select features or multiple feature selection rules may be applied to select features. The feature selection rules may be applied in a cascading fashion, with the feature selection rules being applied in a specific order and applied to the results of the previous rule. For example, the feature occurrence rule may be applied to the training data set 710 to generate a first list of features. A final list of candidate features may be analyzed according to additional feature selection techniques to determine one or more candidate feature groups (e.g., groups of features that may be used to predict whether a label applies or does not apply). Any suitable computational technique may be used to identify the candidate feature groups using any feature selection technique such as filter, wrapper, and/or embedded methods. One or more candidate feature groups may be selected according to a filter method. Filter methods include, for example, Pearson's correlation, linear discriminant analysis, analysis of variance (ANOVA), chi-square, combinations thereof, and the like. The selection of features according to filter methods are independent of any machine learning algorithms. Instead, features may be selected on the basis of scores in various statistical tests for their correlation with the outcome variable (e.g., yes/no).

As another example, one or more candidate feature groups may be selected according to a wrapper method. A wrapper method may be configured to use a subset of features and train a machine learning model using the subset of features. Based on the inferences that drawn from a previous model, features may be added and/or deleted from the subset. Wrapper methods include, for example, forward feature selection, backward feature elimination, recursive feature elimination, combinations thereof, and the like. As an example, forward feature selection may be used to identify one or more candidate feature groups. Forward feature selection is an iterative method that begins with no feature in the machine learning model. In each iteration, the feature which best improves the model is added until an addition of a new variable does not improve the performance of the machine learning model. As an example, backward elimination may be used to identify one or more candidate feature groups. Backward elimination is an iterative method that begins with all features in the machine learning model. In each iteration, the least significant feature is removed until no improvement is observed on removal of features. Recursive feature elimination may be used to identify one or more candidate feature groups. Recursive feature elimination is a greedy optimization algorithm which aims to find the best performing feature subset. Recursive feature elimination repeatedly creates models and keeps aside the best or the worst performing feature at each iteration. Recursive feature elimination constructs the next model with the features remaining until all the features are exhausted. Recursive feature elimination then ranks the features based on the order of their elimination.

As a further example, one or more candidate feature groups may be selected according to an embedded method. Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to absolute value of the magnitude of coefficients and ridge regression performs L2 regularization which adds a penalty equivalent to square of the magnitude of coefficients.

After the training module 720 has generated a feature set(s), the training module 720 may generate one or more machine learning-based classification models 740A-740N based on the feature set(s). A machine learning-based classification model may refer to a complex mathematical model for data classification that is generated using machine-learning techniques. In one example, the machine learning-based classification model 740 may include a map of support vectors that represent boundary features. By way of example, boundary features may be selected from, and/or represent the highest-ranked features in, a feature set.

The training module 720 may use the feature sets extracted from the training data set 710 to build the one or more machine learning-based classification models 740A-740N for each classification category (e.g., yes, no). In some examples, the machine learning-based classification models 740A-740N may be combined into a single machine learning-based classification model 740. Similarly, the ML module 730 may represent a single classifier containing a single or a plurality of machine learning-based classification models 740 and/or multiple classifiers containing a single or a plurality of machine learning-based classification models 740.

The extracted features (e.g., one or more candidate features) may be combined in a classification model trained using a machine learning approach such as discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic regression algorithms; linear regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The resulting ML module 730 may comprise a decision rule or a mapping for each candidate feature.

In an embodiment, the training module 720 may train the machine learning-based classification models 740 as a convolutional neural network (CNN). The CNN may comprise at least one convolutional feature layer and three fully connected layers leading to a final classification layer (softmax). The final classification layer may finally be applied to combine the outputs of the fully connected layers using softmax functions as is known in the art.

The candidate feature(s) and the ML module 730 may be used to predict whether a label (e.g., likely (or not) to execute successfully) applies to a API request in the testing data set. In one example, the result for each API request in the testing data set includes a confidence level that corresponds to a likelihood or a probability that the one or more corresponding variables (e.g., attributes of an API request(s); attributes of an API request set(s); computational variables, etc.) are indicative of the label applying to the API request in the testing data set. The confidence level may be a value between zero and one, and it may represent a likelihood that the API request in the testing data set belongs to a yes/no status with regard to the one or more corresponding variables (e.g., attributes of an API request(s); attributes of an API request set(s); computational variables, etc.). In one example, when there are two statuses (e.g., yes and no), the confidence level may correspond to a value p, which refers to a likelihood that a particular API request in the testing data set belongs to the first status (e.g., yes). In this case, the value 1-p may refer to a likelihood that the particular API request in the testing data set belongs to the second status (e.g., no). In general, multiple confidence levels may be provided for each API request in the testing data set and for each candidate feature when there are more than two labels.

A top performing candidate feature may be determined by comparing the result obtained for each test API request with the known yes/no label for each API request. In general, the top performing candidate feature will have results that closely match the known yes/no labels. The top performing candidate feature(s) may be used to predict the yes/no label of a API request with regard to one or more corresponding variables. For example, a new/unseen API request (or set of API requests) may be determined/received. The new API request (or set of API requests) may be provided to the ML module 730 which may, based on the top performing candidate feature, classify the label as either applying to the new API request (or set of API requests) or as not applying to the new API request (or set of API requests).

Figure 8:
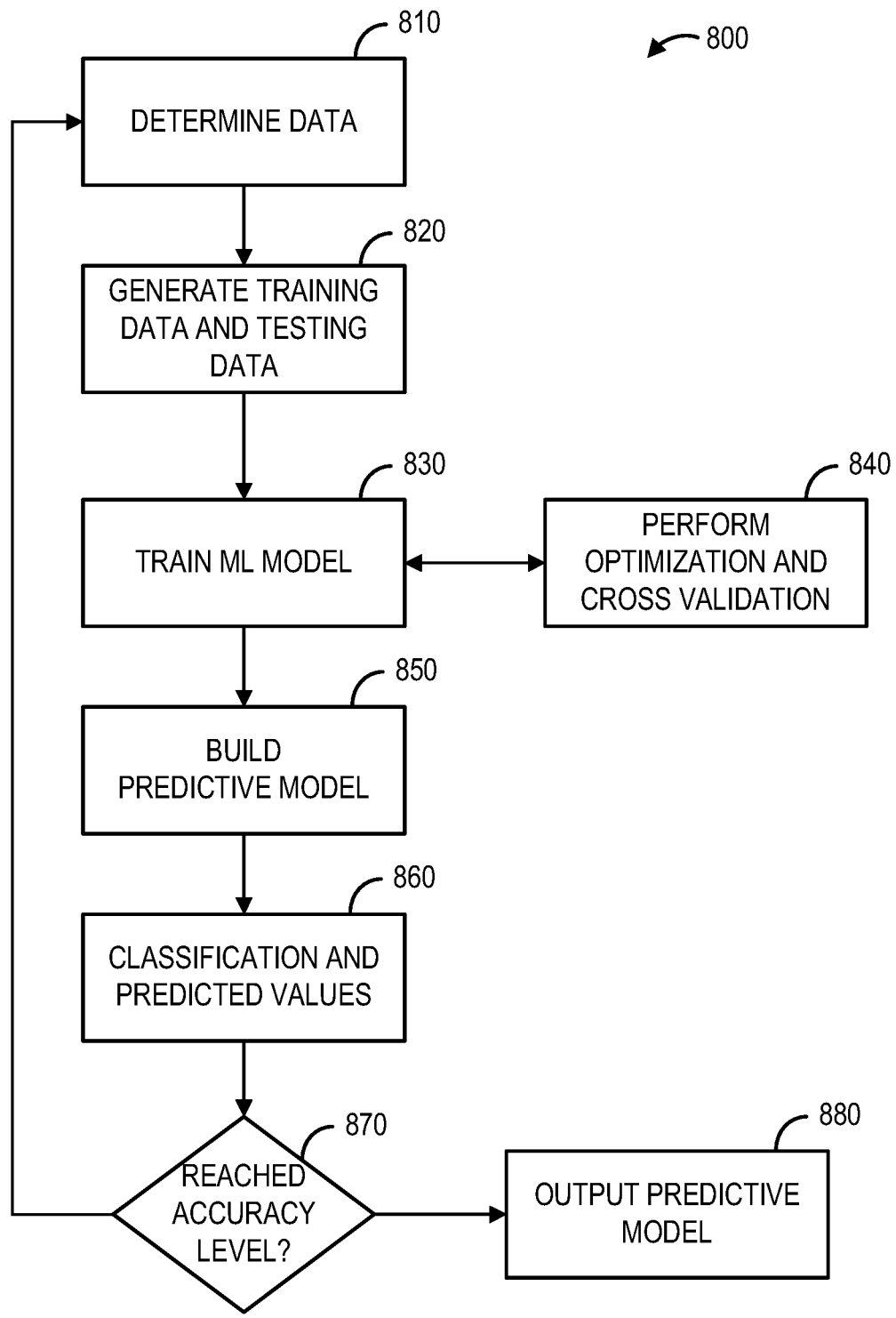
FIG. 8 shows an example method.

Turning now to FIG. 8, a flowchart illustrating an example training method 800 for generating the ML module 730 using the training module 720 is shown. The training module 720 can implement supervised, unsupervised, and/or semi-supervised (e.g., reinforcement based) machine learning-based classification models 740A-740N. The training module 720 may comprise the data processing module 106A and/or the predictive module 106B. The method 800 illustrated in FIG. 8 is an example of a supervised learning method; variations of this example of training method are discussed below, however, other training methods can be analogously implemented to train unsupervised and/or semi-supervised machine learning models.

The training method 800 may determine (e.g., access, receive, retrieve, etc.) first API request sets that have been processed by the data processing module 106A at step 810. The first API request sets may comprise a labeled set of API requests, such as the API requests 104. The labels may correspond to a label (e.g., yes or no) and one or more corresponding variables, such one or more of the computational variables 105. The training method 800 may generate, at step 820, a training data set and a testing data set. The training data set and the testing data set may be generated by randomly assigning labeled API requests to either the training data set or the testing data set. In some implementations, the assignment of labeled API requests as training or testing samples may not be completely random. As an example, a majority of the labeled API requests may be used to generate the training data set. For example, 75% of the labeled API requests may be used to generate the training data set and 25% may be used to generate the testing data set.

The training method 800 may train one or more machine learning models at step 830. In one example, the machine learning models may be trained using supervised learning. In another example, other machine learning techniques may be employed, including unsupervised learning and semi-supervised. The machine learning models trained at 830 may be selected based on different criteria depending on the problem to be solved and/or data available in the training data set. For example, machine learning classifiers can suffer from different degrees of bias. Accordingly, more than one machine learning model can be trained at 830, optimized, improved, and cross-validated at step 840.

For example, a loss function may be used when training the machine learning models at step 830. The loss function may take true labels and predicted outputs as its inputs, and the loss function may produce a single number output. One or more minimization techniques may be applied to some or all learnable parameters of the machine learning model (e.g., one or more learnable neural network parameters) in order to minimize the loss. For example, the one or more minimization techniques may not be applied to one or more learnable parameters, such as modules that have been trained, a neural network block(s), a neural network layer(s), etc. This process may be continuously applied until some stopping condition is met, such as a certain number of repeats of the full training dataset and/or a level of loss for a left-out validation set has ceased to decrease for some number of iterations.

In addition to adjusting these learnable parameters, one or more of the hyperparameters 705 that define the model architecture 703 of the machine learning models may be selected. The one or more hyperparameters 705 may comprise a number of neural network layers, a number of neural network filters in a neural network layer, etc. For example, as discussed above, each set of the hyperparameters 705 may be used to build the model architecture 703, and an element of each set of the hyperparameters 705 may comprise a number of inputs (e.g., API requests, API requests sets, attributes of an API request(s); attributes of an API request set(s); computational variables, etc.) to include in the model architecture 703. The element of each set of the hyperparameters 705 comprising the number of inputs may be considered the "plurality of features" as described herein with respect to the method 500. That is, the cross-validation and optimization performed at step 840 may be considered as a feature selection step.

In order to select the best hyperparameters 705, at step 840 the machine learning models may be optimized by training the same using some portion of the training data (e.g., based on the element of each set of the hyperparameters 705 comprising the number of inputs for the model architecture 703). The optimization may be stopped based on a left-out validation portion of the training data. A remainder of the training data may be used to cross-validate. This process may be repeated a certain number of times, and the machine learning models may be evaluated for a particular level of performance each time and for each set of hyperparameters 705 that are selected (e.g., based on the number of inputs and the particular inputs chosen).

A best set of the hyperparameters 705 may be selected by choosing one or more of the hyperparameters 705 having a best mean evaluation of the "splits" of the training data. A cross-validation object may be used to provide a function that will create a new, randomly-initialized iteration of the method 200 described herein. This function may be called for each new data split and each new set of hyperparameters 705. A cross-validation routine may determine a type of data that is within the input (e.g., attribute type(s)), and a chosen amount of data (e.g., a number of attributes) may be split-off to use as a validation dataset. A type of data splitting may be chosen to partition the data a chosen number of times. For each data partition, a set of the hyperparameters 705 may be used, and a new machine learning model comprising a new model architecture 703 based on the set of the hyperparameters 705 may be initialized and trained. After each training iteration, the machine learning model may be evaluated on the test portion of the data for that particular split. The evaluation may return a single number, which may depend on the machine learning model's output and the true output label. The evaluation for each split and hyperparameter set may be stored in a table, which may be used to select the optimal set of the hyperparameters 705. The optimal set of the hyperparameters 705 may comprise one or more of the hyperparameters 705 having a highest average evaluation score across all splits.

The training method 800 may select one or more machine learning models to build a predictive model at 850. The predictive model may be evaluated using the testing data set. The predictive model may analyze the testing data set and generate one or more of a prediction or a score at step 860. The one or more predictions and/or scores may be evaluated at step 870 to determine whether they have achieved a desired accuracy level. Performance of the predictive model may be evaluated in a number of ways based on a number of true positives, false positives, true negatives, and/or false negatives classifications of the plurality of data points indicated by the predictive model.

For example, the false positives of the predictive model may refer to a number of times the predictive model incorrectly classified a label as applying to a given API request (or request set) when in reality the label did not apply. Conversely, the false negatives of the predictive model may refer to a number of times the machine learning model indicated a label as not applying when, in fact, the label did apply. True negatives and true positives may refer to a number of times the predictive model correctly classified one or more labels as applying or not applying. Related to these measurements are the concepts of recall and precision. Generally, recall refers to a ratio of true positives to a sum of true positives and false negatives, which quantifies a sensitivity of the predictive model. Similarly, precision refers to a ratio of true positives a sum of true and false positives. When such a desired accuracy level is reached, the training phase ends and the predictive model (e.g., the ML module 730) may be output at step 880; when the desired accuracy level is not reached, however, then a subsequent iteration of the training method 800 may be performed starting at step 810 with variations such as, for example, considering a larger collection of API requests (or request sets).

Figure 9:
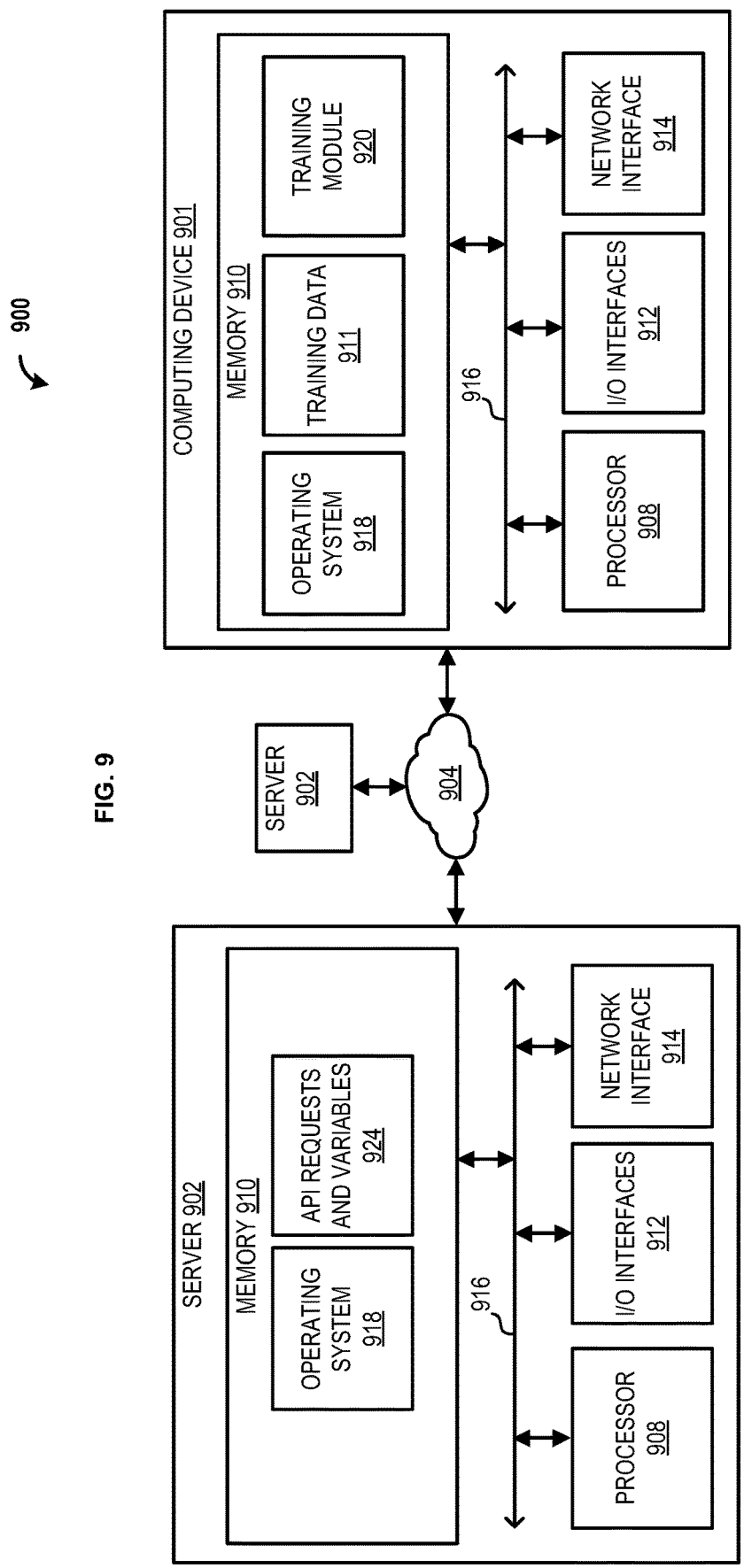
FIG. 9 shows an example system.

FIG. 9 is a block diagram depicting an environment 900 comprising non-limiting examples of a computing device 901 (e.g., the API management device 106 and/or any of the client devices 110A-110C) and a server 902 (e.g., the server 102) connected through a network 904 (e.g., the network 109). In an aspect, some or all steps of any described method herein may be performed by the computing device 901 and/or the server 902. The computing device 901 can comprise one or multiple computers configured to store one or more of the API requests 104, training data 710 (e.g., labeled API requests), the data processing module 106A, the predictive module 106B, and the like. The server 902 can comprise one or multiple computers configured to store the API requests 104. Multiple servers 902 can communicate with the computing device 901 via the through the network 904. In an embodiment, the computing device 901 may comprise a repository for training data 911 generated by the methods described herein.

The computing device 901 and the server 902 can be a digital computer that, in terms of hardware architecture, generally includes a processor 908, memory system 910, input/output (I/O) interfaces 912, and network interfaces 914. These components (908, 910, 912, and 914) are communicatively coupled via a local interface 916. The local interface 916 can be, for example, but not limited to, one or more buses or other wired or wireless connections, as is known in the art. The local interface 916 can have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 908 can be a hardware device for executing software, particularly that stored in memory system 910. The processor 908 can be any custom made or commercially available processor, a central processing unit (CPU), an auxiliary processor among several processors associated with the computing device 901 and the server 902, a semiconductor-based microprocessor (in the form of a microchip or chip set), or generally any device for executing software instructions. When the computing device 901 and/or the server 902 is in operation, the processor 908 can be configured to execute software stored within the memory system 910, to communicate data to and from the memory system 910, and to generally control operations of the computing device 901 and the server 902 pursuant to the software.

The I/O interfaces 912 can be used to receive user input from, and/or for providing system output to, one or more devices or components. User input can be provided via, for example, a keyboard and/or a mouse. System output can be provided via a display device and a printer (not shown). I/O interfaces 992 can include, for example, a serial port, a parallel port, a Small Computer System Interface (SCSI), an infrared (IR) interface, a radio frequency (RF) interface, and/or a universal serial bus (USB) interface.

The network interface 914 can be used to transmit and receive from the computing device 901 and/or the server 902 on the network 904. The network interface 914 may include, for example, a 10BaseT Ethernet Adaptor, a 100BaseT Ethernet Adaptor, a LAN PHY Ethernet Adaptor, a Token Ring Adaptor, a wireless network adapter (e.g., WiFi, cellular, satellite), or any other suitable network interface device. The network interface 914 may include address, control, and/or data connections to enable appropriate communications on the network 904.

The memory system 910 can include any one or combination of volatile memory elements (e.g., random access memory (RAM, such as DRAM, SRAM, SDRAM, etc.) and nonvolatile memory elements (e.g., ROM, hard drive, tape, CDROM, DVDROM, etc.). Moreover, the memory system 910 may incorporate electronic, magnetic, optical, and/or other types of storage media. Note that the memory system 910 can have a distributed architecture, where various components are situated remote from one another, but can be accessed by the processor 908.

The software in memory system 910 may include one or more software programs, each of which comprises an ordered listing of executable instructions for implementing logical functions. In the example of FIG. 9, the software in the memory 910 of the computing device 901 can comprise the training data 911, a training module 920 (e.g., the predictive module 106B), and a suitable operating system (O/S) 918. In the example of FIG. 9, the software in the memory system 910 of the server 902 can comprise API requests and variables 924 (e.g., the API requests 104 and the computational variables 105), and a suitable operating system (O/S) 918. The operating system 918 essentially controls the execution of other computer programs and provides scheduling, input-output control, file and data management, memory management, and communication control and related services.

For purposes of illustration, application programs and other executable program components such as the operating system 918 are illustrated herein as discrete blocks, although it is recognized that such programs and components can reside at various times in different storage components of the computing device 901 and/or the server 902. An implementation of the training module 720 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Turning now to FIG. 10, a flowchart of an example method 1000 for application programming Interface (API) management is shown. The method 1000 may be performed in whole or in part by a single computing device, a plurality of computing devices, and the like. For example, the API management device 106, the training module 520, the server 702, and/or the computing device 704 may be configured to perform the method 1000.

At step 1010, a computing device may receive a plurality of application programming interface (API) request sets and a plurality of computational variables. Each of the plurality of API request sets and each of the plurality of computational variables may each comprise one or more attributes. An example API request set may include one or more API requests that have any (or all) of the following attributes in common: an API call(s), API call type(s), function(s), function type(s), parameter(s), parameter types(s), data type(s), expression(s), expression type(s), calculation(s), calculation type(s), update(s), update type(s), a combination thereof, and/or the like. Each API request may comprise a label indicative of an execution result for that API request, as described herein.

Each API request of the plurality of API request sets may be associated with one or more computational variables of the plurality of computational variables. Each computational variable may comprise one or more of the following: a number of machines (e.g., computing devices) required to process/execute the corresponding API request; an amount of system memory required to process/execute the corresponding API request; an amount of processing resources required to process/execute the corresponding API request; a number of processors; a type of each processor; a total amount of system memory; a type of system memory; a combination thereof; and/or the like.

The computing device may determine a plurality of features for a model architecture to train a predictive model as described herein. The computing device may determine the plurality of features, for example, based on a set of hyperparameters (e.g., a set of the hyperparameters 705).

The set of hyperparameters may comprise a number of neural network layers/blocks, a number of neural network filters in a neural network layer, etc. An element of the set of hyperparameters may comprise a first subset of the plurality of API request sets (e.g., API request attributes/variables) to include in the model architecture and for training a predictive model as described herein. For example, the element of the set of hyperparameters may comprise all API requests within an API request set. Other examples for the first subset of the plurality of API request sets are possible. Another element of the set of hyperparameters may comprise a first subset of the plurality of computational variables (e.g., attributes) to include in the model architecture and for training the predictive model. For example, the first subset of the plurality of computational variables may comprise one or more computational variables described herein. Other examples for the first subset of the plurality of data variables are possible. The computing device may determine a numerical representation for each API request of the plurality of API request sets. Each API request may be associated with a label, such as a binary label (e.g., yes/no) and/or a percentage value. The computing device may use a plurality of processors and/or tokenizers when determining the numerical representation for each API request of the plurality of API request sets. The numerical representation for each API request of each of the plurality of API request sets may comprise at least one of: a string, a hash value, or an array representing the API request, as described herein.

The computing device may determine a numerical representation for each computational variable of the first subset of the plurality of computational variables. The numerical representation for each computational variable may comprise at least one of: a string or an array representing the computational variable, as described herein. Each attribute associated with the computational variable of the first subset of the plurality of computational variables may be associated with the label (e.g., the binary label and/or the percentage value). The computing device may use a plurality of processors and/or tokenizers when determining the numerical representation for each attribute associated with the computational variable of the first subset of the plurality of computational variables that is not of a numeric form (e.g., words, phrases, strings, etc.). For example, determining the numerical representation for each attribute associated with The computational variable of the first subset of the plurality of computational variables may comprise determining, by the plurality of processors and/or tokenizers, for each attribute associated with the computational variable of the first subset of the plurality of computational variables, a token. Each respective token may be used to determine the numerical representation for each attribute associated with the computational variable of the first subset of the plurality of computational variables. One or more attributes associated with one or more variables of the first subset of the plurality of computational variables may comprise at least a non-numeric portion, and each may token comprise the numerical representation for the at least the non-numerical portion. Thus, in some examples, the numerical representation for the at least non-numerical portion of a respective attribute associated with a respective variable may be used to determine the numerical representation for that attribute.

The computing device may generate a vector for each attribute of each API request of the first subset of the plurality of API request sets. For example, the computing device may generate a vector for each attribute of each API request of the first subset of the plurality of API request sets. The computing device may generate the vector for each attribute of each API request of the first subset of the plurality of API request sets based on the numerical representation for each API request of the first subset of the plurality of API request sets. The computing device may generate a vector for each attribute of the computational variables of the first subset of the plurality of computational variables. For example, the computing device may generate a vector for each attribute based on the numerical representation for the computational variables of the first subset of the plurality of computational variables.

At step 1020, the computing device may generate a concatenated vector. For example, the computing device may generate the concatenated vector based on the vector for each attribute of each API request of the first subset of the plurality of API request sets. As another example, the computing device may generate the concatenated vector based on the vector for each attribute of the computational variables of the first subset of the plurality of computational variables. The concatenated vector may be indicative of the label. For example, the concatenated vector may be indicative of the label associated with each attribute of each API request of the first subset of the plurality of API request sets (e.g., the binary label and/or the percentage value). As another example, the concatenated vector may be indicative of the label for the computational variables of the first subset of the plurality of computational variables (e.g., the binary label and/or the percentage value). As discussed above, the plurality of features (e.g., based on the set of hyperparameters) may comprise as few as one or as many as all corresponding attributes associated with the API requests/API request sets and as few as one or as many as all corresponding computational variables. The concatenated vector may therefore be based on as few as one or as many as all corresponding attributes associated with the API requests and the computational variables.

At step 1030, the computing device may train the model architecture based on the concatenated vector. For example, the computing device may train the predictive model based on the concatenated vector. At step 1040, the computing device may output (e.g., save) the model architecture as a trained predictive model. The computing device may optimize the predictive model based on a second subset of the plurality of API request sets, a second subset of the plurality of computational variables, and/or a cross-validation technique using a set of hyperparameters as described herein with respect to step 850 of the method 800.

Turning now to FIG. 11, a flowchart of an example method 1100 for application programming Interface (API) management is shown. The method 1100 may be performed in whole or in part by a single computing device, a plurality of computing devices, and the like. For example, the API management device 106, the training module 520, the server 702, and/or the computing device 704 may be configured to perform the method 1100.

A model architecture may be used by a computing device to provide one or more of a score or a prediction associated with a previously unseen API request(s) and a previously unseen plurality of computational variables. The model architecture may have been previously trained based on a plurality of features, such as a set of hyperparameters (e.g., a set of the hyperparameters 505). The set of hyperparameters may comprise a number of neural network layers/blocks, a number of neural network filters in a neural network layer, etc.

At step 1110, the computing device may receive an API request set and a plurality of computational variables. The API request set and each of the plurality of computational variables may each comprise one or more attributes. The API request set may be associated with one or more variables of the plurality of computational variables. The API request set may include one or more API requests that have any (or all) of the following attributes in common: an API call(s), API call type(s), function(s), function type(s), parameter(s), parameter types(s), data type(s), expression(s), expression type(s), calculation(s), calculation type(s), update(s), update type(s), a combination thereof, and/or the like. Each API request may comprise an API call, an API update, or programming code for an API. Each API request may comprise a plurality of function parameters, and each API request may be indicative of a value for each of the plurality of function parameters. Each API request may comprise a label indicative of an execution result for that API request, as described herein. Each API request of the API request set may be associated with one or more computational variables of the plurality of computational variables. Each computational variable may comprise one or more of the following: a number of machines (e.g., computing devices) to process/execute the corresponding API request; an amount of system; an amount of processing resources; a number of processors; a type of each processor; a total amount of system memory; a type of system memory; a combination thereof; and/or the like.

The computing device may determine a numerical representation for one or more attributes (e.g., each API request) associated with the API request set. The numerical representation for each of the one or more attributes (e.g., each API request) associated with the API request set may comprise at least one of: a string, a hash value, or an array representing the attribute/API request, as described herein. For example, the computing device may determine the numerical representation for each of the one or more attributes associated with the API request in a similar manner as described herein with respect to step 204 of the method 200.

The computing device may determine a numerical representation for each of one or more attributes associated with the plurality of computational variables (e.g., for each computational variable). The numerical representation for each of one or more attributes associated with the plurality of computational variables may comprise at least one of: a string or an array representing the computational variable, as described herein. For example, the computing device may determine the numerical representation for each attribute associated with each of the plurality of computational variables in a similar manner as described herein with respect to step 204 of the method 200.

At step 1120, the computing device may generate a concatenated vector. For example, the computing device may generate the concatenated vector based on the numerical representations described above. As another example, the computing device may generate the concatenated vector based on a vector for each of the one or more attributes associated with the API request set and a vector for each variable (e.g., attribute) of the plurality of computational variables. At step 1130, the computing device may determine one or more of a prediction or a score associated with the API request set and the plurality of computational variables. For example, the computing device may use a trained predictive model of the model architecture to determine one or more of the prediction or the score associated with the API request set and the plurality of computational variables. The trained predictive model may comprise the model architecture described above in the method 800. The trained predictive model may determine one or more of the prediction or the score associated with the API request set and the plurality of computational variables based on the concatenated vector. The score may be indicative of a likelihood that a first label applies to the API request set (or an API request therein) and/or one or more of the plurality of computational variables. For example, the first label may comprise a binary label (e.g., yes/no) and/or a percentage value.

Turning now to FIG. 12, a flowchart of an example method 1200 for application programming interface (API) management is shown. The method 1200 may be performed in whole or in part by a single computing device, a plurality of computing devices, and the like. For example, the API management device 106, the training module 520, the server 702, and/or the computing device 704 may be configured to perform the method 1200.

At step 1210, a computing device may receive an API request and a plurality of computational variables. The API request and each of the plurality of computational variables may each comprise one or more attributes. The API request may be associated with one or more variables of the plurality of computational variables. The API request may comprise any (or all) of the following attributes: an API call(s), API call type(s), function(s), function type(s), parameter(s), parameter types(s), data type(s), expression(s), expression type(s), calculation(s), calculation type(s), update(s), update type(s), a combination thereof, and/or the like. The API request may comprise an API call, an API update, or programming code for an API. The API request may comprise a plurality of function parameters and a value for each of the plurality of function parameters. Each computational variable may comprise one or more of the following: a number of machines (e.g., computing devices) to process/execute the corresponding API request; an amount of system; an amount of processing resources; a number of processors; a type of each processor; a total amount of system memory; a type of system memory; a combination thereof; and/or the like.

The computing device (or another computing device) may determine a numerical representation for the API request. The numerical representation may comprise at least one of: a string, a hash value, or an array representing the API request, as described herein. For example, the computing device (or another computing device) may determine the numerical representation for the API request in a similar manner as described herein with respect to step 204 of the method 200. The computing device (or another computing device) may determine a numerical representation for each of the plurality of computational variables (e.g., for each computational variable). The numerical representation for each of the plurality of computational variables may comprise at least one of: a string or an array representing the computational variable, as described herein. For example, the computing device (or another computing device) may determine the numerical representation for each of the plurality of computational variables in a similar manner as described herein with respect to step 204 of the method 200.

The computing device (or another computing device) may generate a concatenated vector. For example, the computing device (or another computing device) may generate the concatenated vector based on the numerical representations described above. As another example, the computing device (or another computing device) may generate the concatenated vector based on a vector for each attribute associated with the API request and a vector for each variable (e.g., attribute) of the plurality of computational variables.

At step 1220, the computing device (or another computing device) may determine an execution prediction associated with the API request and the plurality of computational variables. For example, the computing device (or another computing device) may use a trained predictive model to determine the execution prediction associated with the API request and the plurality of computational variables. The trained predictive model may comprise the model architecture described above in the method 800. The trained predictive model may determine the execution prediction associated with the API request and the plurality of computational variables based on the concatenated vector.

The execution prediction may indicate that the API request is not likely to execute successfully. At step 1230, the computing device may cause the API request to be blocked based on the execution prediction. For example, the computing device may comprise the API management device 106, which may cause the API request not to be executed. The API request may have been received from a client device, such as one of the client devices 110A-110C, and the computing device may indicate to the client device that the API request has been blocked/is not to be executed (e.g., via one or more messages sent to the client device). Other examples are possible as well.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:
  receiving, at a computing device associated with an application programming interface (API), from a plurality of client devices that access the API via the computing device, a plurality of API request sets and a plurality of computational variables associated with computational resources required for execution of the plurality of API request sets, wherein each API request set of the plurality of API request sets comprises one or more API requests sent by one or more client devices of the plurality of client devices, and wherein each of the one or more API requests comprises a function name, a request type, and at least one computational variable, of the plurality of computational variables, indicative of at least one computational resource required for execution of the corresponding API request;
  converting each of the one or more API requests of each of the plurality of API request sets into a corresponding array of binary values, wherein a first portion of each corresponding array of binary values is indicative of the function name, wherein a second portion of each corresponding array of binary values is indicative of the corresponding request type, and wherein a third portion of each corresponding array of binary values is indicative of the corresponding at least one computational variable;
  generating, based on the corresponding array of binary values for each of the one or more API requests of each of the plurality of API request sets, a concatenated vector for each API request set of the plurality of API request sets;
  training, based on the concatenated vector for each API request set of the plurality of API request sets, a predictive model, wherein the concatenated vector for each API request set is indicative of the function name, the request type, and the at least one computational variable associated with each of the one or more API requests for the corresponding API request set;
  receiving, based on at least one further API request sent to the computing device by a first client device, of the plurality of client devices, a first concatenated vector for the at least one further API request, wherein the first concatenated vector is indicative of a function name, a request type, and at least one computational variable associated with the at least one further API request;
  determining, via the predictive model, and based on the first concatenated vector, an expected execution result for the at least one further API request; and
  causing, based on the expected execution result, the at least one further API request to be blocked from execution by the API, wherein the expected execution result is provided to the first client device with an indication of at least one computational resource that would be required for execution of the at least one further API request.

2. The method of claim 1, wherein the indication of the at least one computational resource that would be required for execution of the at least one further API request comprises an indication of a quantity of memory that would be required for execution of the at least one further API request.

3. The method of claim 1, wherein each of the one or more API requests of each of the plurality of API request sets comprises at least one of: a string or a hash value.

4. The method of claim 1, wherein the at least one computational variable associated with each of the one or more API requests comprises at least one string value.

5. The method of claim 1, wherein the predictive model comprises a neural network, and wherein training the predictive model comprises training the neural network according to a set of hyperparameters.

6. The method of claim 5, wherein the set of hyperparameters comprises at least one of: a quantity of inputs for the neural network, wherein the quantity of inputs comprises at least one of: a quantity of computational variables or a quantity of API requests; or a quantity of outputs for the neural network.

7. An apparatus comprising:
  one or more processors; and
  memory storing processor-executable instructions that, when executed by the one or more processors, cause the apparatus to:
  receive, via an application programming interface (API), from a plurality of client devices that access the API, a plurality of API request sets and a plurality of computational variables associated with computational resources required for execution of the plurality of API request sets, wherein each API request set of the plurality of API request sets comprises one or more API requests sent by one or more client devices of the plurality of client devices, and wherein each of the one or more API requests comprises a function name, a request type, and at least one computational variable, of the plurality of computational variables, indicative of at least one computational resource required for execution of the corresponding API request;

convert each of the one or more API requests of each of the plurality of API request sets into a corresponding array of binary values, wherein a first portion of each corresponding array of binary values is indicative of the function name, wherein a second portion of each corresponding array of binary values is indicative of the corresponding request type, and wherein a third portion of each corresponding array of binary values is indicative of the corresponding at least one computational variable;

generate, based on the corresponding array of binary values for each of the one or more API requests of each of the plurality of API request sets, a concatenated vector for each API request set of the plurality of API request sets;

train, based on the concatenated vector for each API request set of the plurality of API request sets, a predictive model, wherein the concatenated vector for each API request set is indicative of the function name, the request type, and the at least one computational variable associated with each of the one or more API requests for the corresponding API request set;

receive, based on at least one further API request sent by a first client device, of the plurality of client devices, a first concatenated vector for the at least one further API request, wherein the first concatenated vector is indicative of a function name, a request type, and at least one computational variable associated with the at least one further API request;

determine, via the predictive model, and based on the first concatenated vector, an expected execution result for the at least one further API request; and cause, based on the expected execution result, the at least one further API request to be blocked from execution by the API, wherein the expected execution result is provided to the first client device with an indication of at least one computational resource that would be required for execution of the at least one further API request.

8. The apparatus of claim 7, wherein the indication of the at least one computational resource that would be required for execution of the at least one further API request comprises an indication of a quantity of memory that would be required for execution of the at least one further API request.

9. The apparatus of claim 7, wherein each of the one or more API requests of each of the plurality of API request sets comprises at least one of: a string or a hash value.

10. The apparatus of claim 7, wherein the at least one computational variable associated with each of the one or more API requests comprises at least one string value.

11. The apparatus of claim 7, wherein the predictive model comprises a neural network, and wherein the processor-executable instructions that cause the apparatus to train the predictive model further cause the apparatus to train the neural network according to a set of hyperparameters, wherein the set of hyperparameters comprises at least one of:

a quantity of inputs for the neural network, wherein the quantity of inputs comprises at least one of: a quantity of computational variables or a quantity of API requests; or a quantity of outputs for the neural network.

12. One or more non-transitory computer-readable media comprising processor-executable instructions that, when executed by one or more processors, cause the one or more processors to:

receive, via an application programming interface (API), from a plurality of client devices that access the API, a plurality of API request sets and a plurality of computational variables associated with computational resources required for execution of the plurality of API request sets, wherein each API request set of the plurality of API request sets comprises one or more API requests sent by one or more client devices of the plurality of client devices, and wherein each of the one or more API requests comprises a function name, a request type, and at least one computational variable, of the plurality of computational variables, indicative of at least one computational resource required for execution of the corresponding API request;

convert each of the one or more API requests of each of the plurality of API request sets into a corresponding array of binary values, wherein a first portion of each corresponding array of binary values is indicative of the function name, wherein a second portion of each corresponding array of binary values is indicative of the corresponding request type, and wherein a third portion of each corresponding array of binary values is indicative of the corresponding at least one computational variable;

generate, based on the corresponding array of binary values for each of the one or more API requests of each of the plurality of API request sets, a concatenated vector for each API request set of the plurality of API request sets;

train, based on the concatenated vector for each API request set of the plurality of API request sets, a predictive model, wherein the concatenated vector for each API request set is indicative of the function name, the request type, and the at least one computational variable associated with each of the one or more API requests for the corresponding API request set;

receive, based on at least one further API request sent by a first client device, of the plurality of client devices, a first concatenated vector for the at least one further API request, wherein the first concatenated vector is indicative of a function name, a request type, and at least one computational variable associated with the at least one further API request;

determine, via the predictive model, and based on the first concatenated vector, an expected execution result for the at least one further API request; and cause, based on the expected execution result, the at least one further API request to be blocked from execution by the API, wherein the expected execution result is provided to the first client device with an indication of at least one computational resource that would be required for execution of the at least one further API request.

13. The one or more non-transitory computer-readable media of claim 12, wherein the indication of the at least one computational resource that would be required for execution of the at least one further API request comprises an indication of a quantity of memory that would be required for execution of the at least one further API request.

14. The one or more non-transitory computer-readable media of claim 12, wherein each of the one or more API requests of each of the plurality of API request sets comprises at least one of: a string or a hash value.

15. The one or more non-transitory computer-readable media of claim 12, wherein the at least one computational variable associated with each of the one or more API requests comprises at least one string value.

16. The one or more non-transitory computer-readable media of claim 12, wherein the predictive model comprises a neural network, and wherein the processor-executable instructions that cause the one or more processors to train the predictive model further cause the one or more processors to train the neural network according to a set of hyperparameters.

17. The one or more non-transitory computer-readable media of claim 16, wherein the set of hyperparameters comprises at least one of:
   a quantity of inputs for the neural network, wherein the quantity of inputs comprises at least one of: a quantity of computational variables or a quantity of API requests; or
   a quantity of outputs for the neural network.

* * * * *